United States Patent
Suk

(10) Patent No.: US 6,279,588 B1
(45) Date of Patent: Aug. 28, 2001

(54) METHOD AND APPARATUS FOR WASHING AND DRYING GLASSES FOR LCDS/PDPS WHILE BEING FREE FROM LEAVING ANY SPOT ON THE GLASSES

(76) Inventor: In Gon Suk, Mugunghwajutack B-102, 790-1, Samyong-dong, Chonan city, Chungchongnam-do, Seoul (KR)

( * ) Notice: Subject to any disclaimer, the term of this patent is extended or adjusted under 35 U.S.C. 154(b) by 0 days.

(21) Appl. No.: 09/350,616

(22) Filed: Jul. 9, 1999

(51) Int. Cl.⁷ .................................................. B08B 3/02
(52) U.S. Cl. ................................................ 134/68; 134/902
(58) Field of Search ................................ 134/61, 66, 68, 134/902

(56) References Cited

U.S. PATENT DOCUMENTS 5,899,216 * 5/1999 Goudie et al. ........................ 134/61
5,950,327 * 9/1999 Peterson et al. .................... 134/61 X

* cited by examiner

*Primary Examiner*—Philip R. Coe
(74) *Attorney, Agent, or Firm*—Mathew, Collins, Shepard & Gould, P.A.

(57) ABSTRACT

A method and apparatus for washing and drying glasses for LCDs or PDPs while being free from leaving any spot on the glasses is disclosed. In the method of this invention, pressurized pure water is continuously sprayed onto the surface of each LCD/PDP glass when the glass is fed from a washing unit by a second conveyor unit and when the glass is loaded on a spin dryer unit by the glass holding finger of a robot. The method thus prevents the surface of the LCD/PDP glass from being partially dried, thus allowing the surface of the glass to be free from any spot due to washing water. The apparatus of this invention has first and second pure water supply pipes respectively arranged above the second conveyor unit and in the glass holding finger of the robot, with a plurality of nozzles being provided on each of the first and second pure water supply pipes. The above pipes continuously spray pressurized pure water onto the surface of each LCD/PDP glass when the glasses are fed from the washing unit by the second conveyor unit and when the glasses are loaded on the spin dryer unit by the robot.

1 Claim, 4 Drawing Sheets

METHOD AND APPARATUS FOR WASHING AND DRYING GLASSES FOR LCDS/PDPS WHILE BEING FREE FROM LEAVING ANY SPOT ON THE GLASSES

BACKGROUND OF THE INVENTION

1. Field of the Invention

The present invention relates, in general, to a process of manufacturing LCDs or PDPs and, more particularly, to a method and apparatus for washing and drying glasses for the LCDs or PDPs while being free from leaving any spot on the glasses.

2. Description of the Prior Art

As well known to those skilled in the art, it is necessary to keep the surface of a glass used for producing LCDs (liquid crystal displays) or PDPs (plasma display panels) highly clean during a process of manufacturing such LCDs or PDPs. In order to accomplish the above object, the glasses for LCDs or PDPs, which will be referred to simply as "LCD/PDP glasses" hereinbelow, have to be washed and dried during a process of manufacturing the LCDs or PDPs.

FIG. 7 is a plan view, showing a conventional apparatus for washing and drying such LCD/PDP glasses.

As shown in the drawing, the LCD/PDP glass washing and drying apparatus "CD" comprises a plurality of units: a first conveyor unit 1, a washing unit 2, a second conveyor unit 3, a robot 4, an spin dryer unit 5, a third conveyor unit 6, a hot plate unit 7, a cool plate unit 8, and a cassette loader unit 9, which are arranged in order along the longitudinal axis of the apparatus. The first conveyor unit 1 is used for feeding a post-processed LCD/PDP glass to a next step. The washing unit 2 is used for washing the LCD/PDP glass fed by the first conveyor unit 1. The second conveyor unit 3 is used for feeding the glass from the washing unit 2 to a next step. The robot 4 is used for loading or unloading the glass, fed by the second conveyor unit 3, on or from a spin dryer unit 5. The spin dryer unit 5 is used for rotating the glass, loaded thereon by the robot 4, at a high speed, thus primarily drying the glass. The third conveyor unit 6 is used for feeding the glass, dried by the spin dryer unit 5 and unloaded from the unit 5 by the robot 4, to a next step. The hot plate unit 7 is used for thermally heating and finally drying the glass fed by the third conveyor unit 6. The cool plate unit 8 is used for cooling the glass from the hot plate unit 7. The cassette loader unit 9 is used for stacking the glasses from the cool plate unit 8 in a way such that one is laid on top of another.

However, the above LCD/PDP glass washing and drying apparatus "CD" is problematic in that the glass comes into contact with atmospheric air when the glass is fed from the washing unit 2 by the second conveyor unit 3 or is loaded on the spin dryer unit 5 by the robot 4, thus being partially dried with undesirable spots being left on the glass due to washing water. When such spots are left on the glass due to washing water as described above, it is almost impossible to completely remove the spots from the glass even though the glass is completely dried by the spin dryer unit 5. The spots, left on the glass due to the washing water, finally reduce the quality of the resulting LCDs or PDPs.

SUMMARY OF THE INVENTION

Accordingly, the present invention has been made keeping in mind the above problems occurring in the prior art, and an object of the present invention is to provide a method and apparatus for washing and drying LCD/PDP glasses, which is almost completely free from leaving any spot on the glasses, with such a spot being typically formed on a glass due to washing water when the glass is partially dried while being fed from a washing unit by a second conveyor unit or being loaded on a spin dryer unit by a robot.

In order to accomplish the above object, the present invention provides a method of washing and drying glasses for liquid crystal displays or plasma display panels during a process of manufacturing such displays or panels, comprising the steps of primarily feeding a post-processed glass to a washing unit using a first conveyor unit, washing the glass at the washing unit, secondarily feeding the glass from the washing unit using a second conveyor, and loading the glass, fed from the washing unit, on a spin dryer unit using a robot prior to drying the glass at the spin dryer unit, further comprising the step of: continuously spraying pure water onto the surface of each of the glasses when the glasses are fed from the washing unit by the second conveyor unit and when the glasses are loaded on the spin dryer unit by the robot, thus preventing the surface of each glass from being partially dried and thereby allowing the surface of each glass to be free from any spot due to washing water.

The present invention also provides an apparatus for washing and drying glasses for liquid crystal displays or plasma display panels during a process of manufacturing such displays or panels, comprising a first conveyor unit used for feeding a post-processed glass to a next step, a washing unit used for washing the glass fed by the first conveyor unit, a second conveyor unit used for feeding the glass from the washing unit to a next step, a robot used for loading or unloading the glass, fed by the second conveyor unit, on or from a spin dryer unit, the spin dryer unit used for rotating the glass, loaded on the dryer unit by the robot, at a high speed, thus primarily drying the glass, a third conveyor unit used for feeding the glass, dried by the spin dryer unit and unloaded from the spin dryer unit by the robot, to a next step, a hot plate unit used for thermally heating and finally drying the glass fed by the third conveyor unit, a cool plate unit used for cooling the glass from the hot plate unit, and a cassette loader unit used for stacking such glasses from the cool plate unit in a way such that one glass is laid on top of another glass, further comprising: first and second pure water supply pipes respectively arranged above the second conveyor unit and in a glass holding finger of the robot, with a plurality of pure water spray nozzles being provided on each of the pure water supply pipes, the pipes continuously spraying pure water onto the surface of each of the glasses when the glasses are fed from the washing unit by the second conveyor unit and when the glasses are loaded on the spin dryer unit by the robot, thus preventing the surface of each glass from being partially dried and thereby allowing the surface of each glass to be free from any spot due to washing water.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
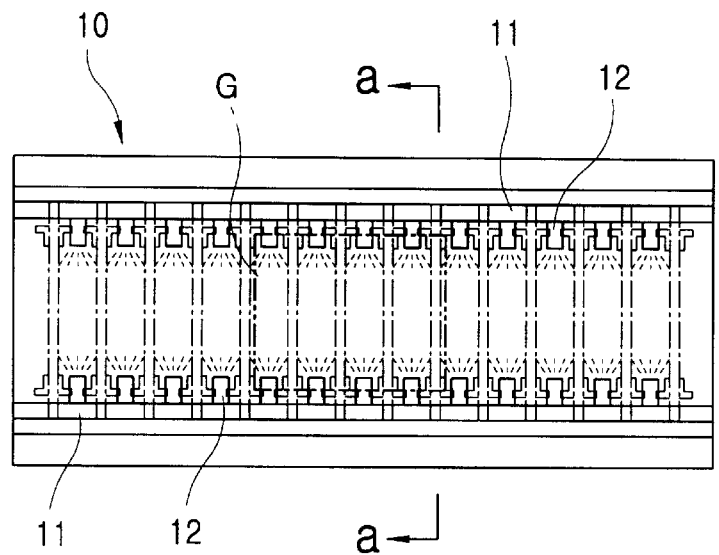
FIG. 1 is a plan view, showing the construction of a second conveyor unit included in the LCD/PDP glass washing and drying apparatus in accordance with the preferred embodiment of the present invention.
Figure 2:
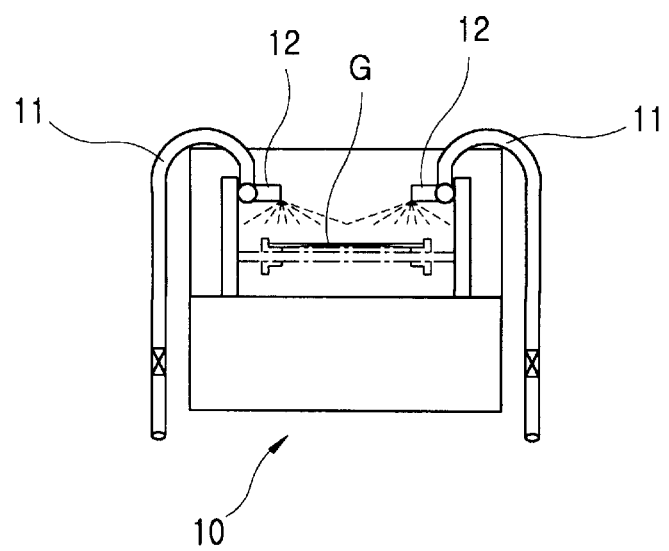
FIG. 2 is a sectional view of the above second conveyor unit taken along the line a—a of FIG. 1.
Figure 3:
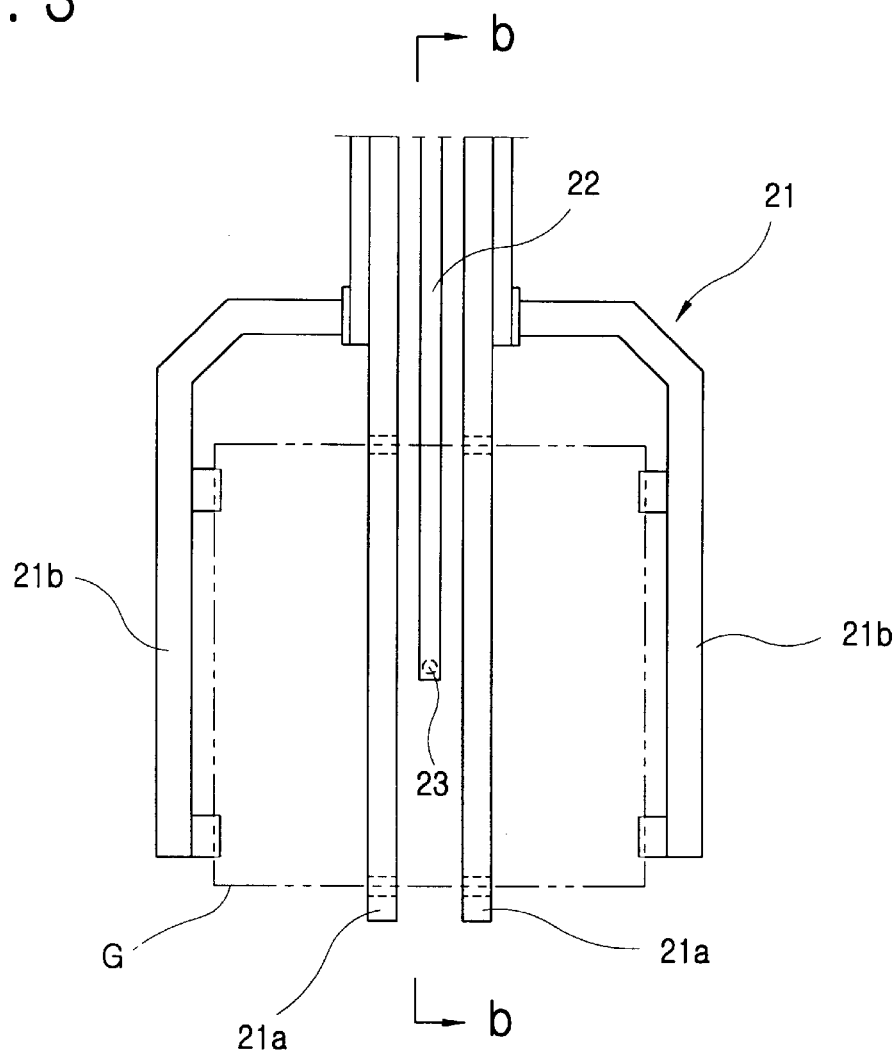
FIG. 3 is a plan view, showing the construction of a glass holding finger of a robot included in the LCD/PDP glass washing and drying apparatus in accordance with the preferred embodiment of the present invention.
Figure 4:
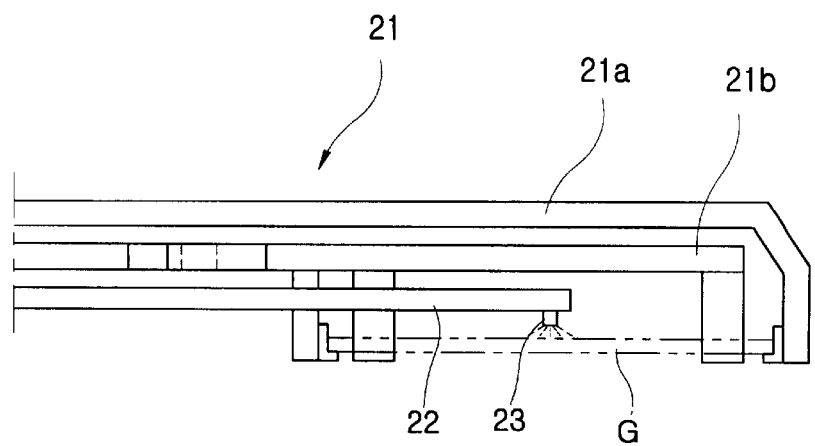
FIG. 4 is a sectional view of the above finger taken along the line b—b of FIG. 3.

FIG. 1 is a plan view, showing the construction of a second conveyor unit included in the LCD/PDP glass washing and drying apparatus in accordance with the preferred embodiment of this invention. FIG. 2 is a sectional view of the above second conveyor unit taken along the line a—a of FIG. 1. FIG. 3 is a plan view, showing the construction of a glass holding finger of a robot included in the above apparatus. FIG. 4 is a sectional view of the above finger taken along the line b—b of FIG. 3.

Figure 7:
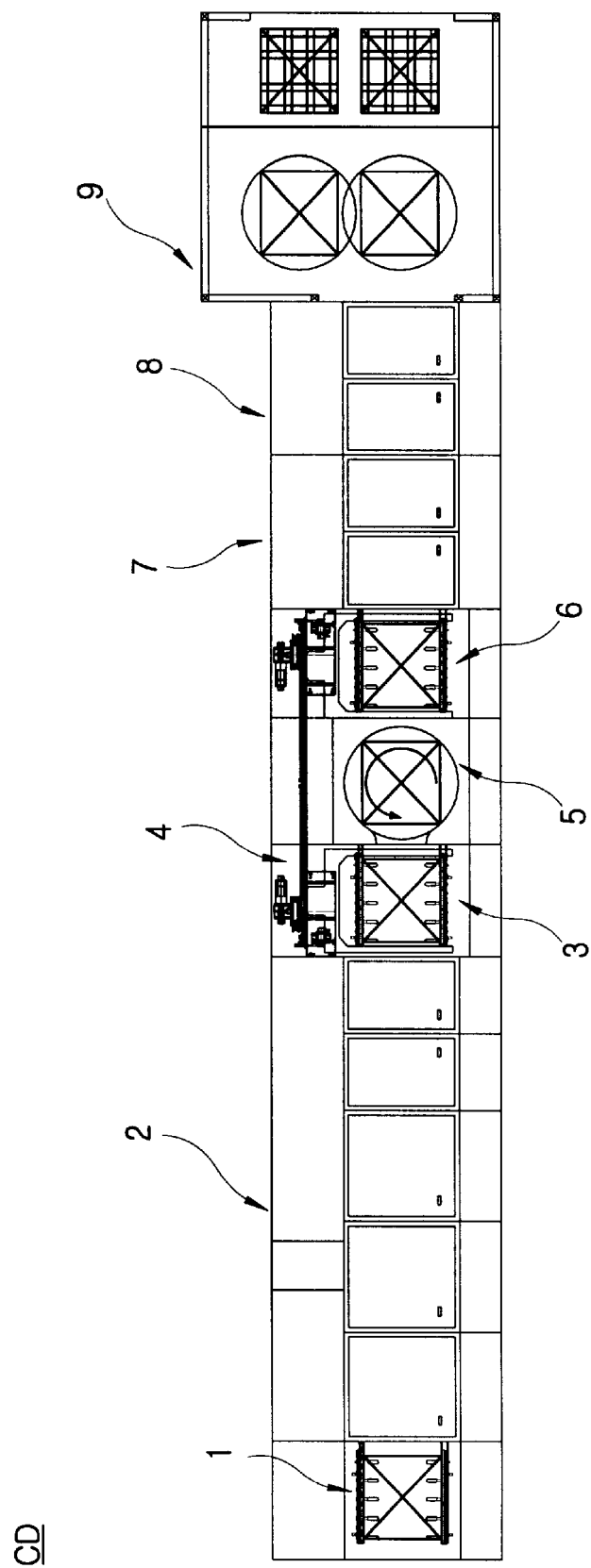
FIG. 7 is a plan view, showing a conventional LCD/PDP glass washing and drying apparatus.

As shown in the drawings, the LCD/PDP glass washing and drying apparatus of this invention comprises a first conveyor unit used for feeding a post-processed glass to a next step, a washing unit used for washing the glass fed by the first conveyor unit, and a second conveyor unit used for feeding the glass from the washing unit to a next step. The apparatus also has a robot used for loading or unloading the glass, fed by the second conveyor unit, on or from a spin dryer unit. In the apparatus, the spin dryer unit is used for rotating the glass, loaded on the dryer unit by the robot, at a high speed, thus primarily drying the glass. The apparatus further comprises a third conveyor unit used for feeding the glass, dried by the spin dryer unit and unloaded from the spin dryer unit by the robot, to a next step. The apparatus also has a hot plate unit and a cool plate unit. The above hot plate unit is used for thermally heating and finally drying the glass fed by the third conveyor unit. The cool plate unit is used for cooling the glass from the hot plate unit. In order to stack such glasses from the cool plate unit in a way such that one glass is laid on top of another glass, the apparatus also includes a cassette loader unit. The above-mentioned construction of the apparatus of this invention remains the same as that of the conventional apparatus of FIG. 7. However, in order to accomplish the object of the present invention, the apparatus of this invention is added with a means designed to continuously spray pure water onto the surface of each of the glasses when the glasses are fed from the washing unit by the second conveyor unit and when the glasses are loaded on the spin dryer unit by the robot, thus allowing the surface of the glasses to be almost completely free from any spot due to washing water. The pure water spraying means of this invention is arranged above the second conveyor unit and in a glass holding finger of the robot as will be described in detail hereinbelow.

In a detailed description, a first pure water supply pipe 11 is arranged along each edge of the second conveyor unit 10 at a position above the unit 10 as shown in FIGS. 1 and 2. A plurality of spray nozzles 12 are regularly provided on each of the first pure water supply pipes 11.

Figure 5:
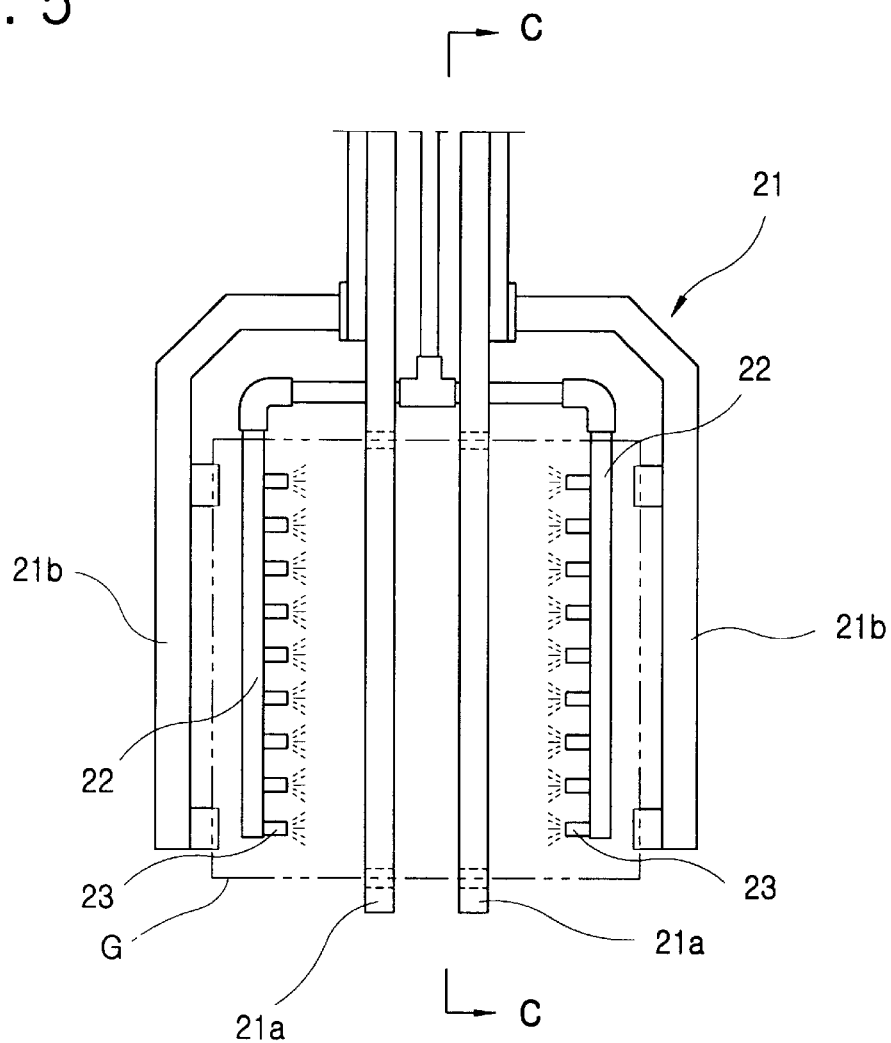
FIG. 5 is a plan view, showing the construction of a glass holding finger in accordance with another embodiment of the present invention.
Figure 6:
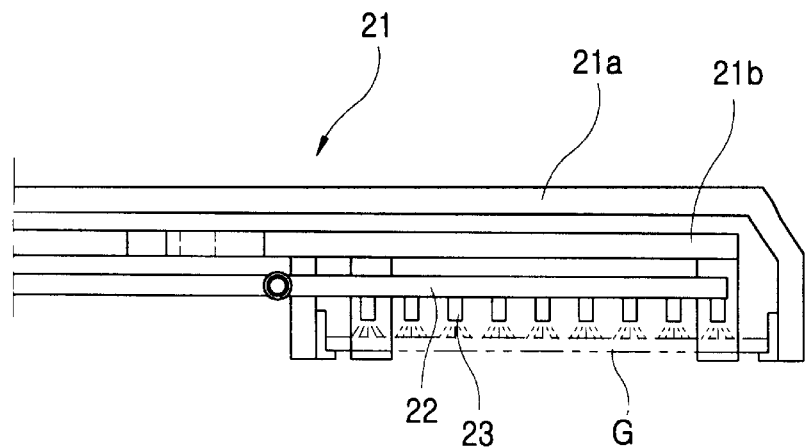
FIG. 6 is a sectional view of the above finger taken along the line c—c of FIG. 5.

In the apparatus of this invention, the robot, used for loading or unloading an LCD/PDP glass "G" on or from the spin dryer unit, comprises a glass holding finger 21. The above finger 21 consists of two sets of finger parts: two upper finger parts 21a and two lower finger parts 21b as shown in FIGS. 3 and 4. The upper finger parts 21a are used for holding front and rear surfaces of the LCD/PDP glass, while the two lower finger parts 21b are used for holding opposite side surfaces of the LCD/PDP glass. In the primary embodiment of this invention, a second pure water supply pipe 22 is arranged between the two upper finger parts 21a with a second spray nozzle 23 being formed on the end of the second pure water supply pipe 22 as shown in FIGS. 3 and 4. However, in accordance with the second embodiment of this invention, the pure water supply pipe 22 may be branched into two arm parts at its outlet end portion, with a plurality of nozzles 23 being regularly formed along each of the two arm parts as shown in FIGS. 5 and 6. In the second embodiment, the two arm parts of the pure water supply pipe 22 are parallely arranged between the two upper finger parts 21a and the two lower finger parts 21b. In the present invention, such two designs of the second pure water supply pipe 22 may be selected in accordance with the size of LCD/PDP glasses.

Of course, the nozzles 12 and 23 of the first and second pure water supply pipes 11 and 22 are positioned on the pipes 11 and 22 in a way such that they are directed to the top surface of an LCD/PDP glass, which is fed by the conveyor unit 10 or is held by the finger 21 of the robot.

During a process of manufacturing LCDs or PDPs, an LCD/PDP glass is washed and dried by the above-mentioned apparatus as will be described hereinbelow.

When an LCD/PDP glass "G" is completely washed at the washing unit, the glass is fed from the washing unit to the spin dryer unit by the second conveyor unit 10. When the glass is fed from the washing unit to a position around the spin dryer unit by the second conveyor unit 10, pressurized pure water is continuously sprayed onto the surface of the glass from the nozzles 12 of the first pure water supply pipe 11 which is positioned above the second conveyor unit 10. When the glass, carried on the second conveyor unit 10, reaches a position around the spin dryer unit, the glass is held by the finger 21 of the robot prior to being moved to the spin dryer unit in the same manner as that of a conventional process. When the glass is moved to the spin dryer unit by the robot, pressurized pure water is continuously sprayed onto the surface of the glass from the nozzles 23 of the second pure water supply pipe 22. In such a case, the pipe 22 is moved along with the finger 21 of the robot. When the glass is completely loaded on the spin dryer unit by the robot, the glass is released from the finger 21 of the robot prior to being rotated by the spin dryer unit at a high speed. The glass is thus primarily dried. After the glass is primarily dried by the spin dryer unit, the glass is held by the finger 21 of the robot and is unloaded from the spin dryer unit. The glass, unloaded from the spin dryer unit, is subjected to a next step. That is, the glass is fed from the spin dryer unit to the hot plate unit by the third conveyor unit so as to be thermally heated and finally dried.

In a brief description, the method and apparatus of this invention continuously sprays pressurized pure water onto the surface of an LCD/PDP glass "G" when the glass is fed from the washing unit by the second conveyor unit 10 and when the glass is loaded on the spin dryer unit by the finger 21 of the robot. The pure water, sprayed from the nozzles 12 and 23 of the pipes 11 and 22, onto the surface of the glass "G", prevents the surface of the glass from being partially dried when the glass is fed from the washing unit by the second conveyor unit 10 and when the glass is loaded on the spin dryer unit by the finger 21 of the robot. The LCD/PDP glass is thus free from any spot due to washing water.

As described above, the present invention provides a method and apparatus for washing and drying LCD/PDP glasses while being free from leaving any spot on the glasses during a process of manufacturing such LCDs or PDPs. In the method and apparatus of this invention, pressurized pure water is continuously sprayed from the nozzles of first and second pure water supply pipes onto the surface of an LCD/PDP glass when the glass is fed from a washing unit by a second conveyor unit and when the glass is loaded on a spin dryer unit by the glass holding finger of a robot.

The pure water, sprayed from the nozzles of the pure water supply pipes onto the surface of the glass, prevents the surface of the glass from being partially dried. Therefore, the LCD/PDP glass is free from any spot due to washing water. The method and apparatus of this invention thus improves the quality of resulting LCDs or PDPs manufactured using the glasses. Such high quality LCDs or PDPs finally accomplish a desired operational reliability of electronic equipment using the LCDs or PDPs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for washing and drying glasses for liquid crystal displays or plasma display panels during a process of manufacturing such displays or panels, comprising a first conveyor unit used for feeding a post-processed glass to a next step, a washing unit used for washing the glass fed by the first conveyor unit, a second conveyor unit used for feeding the glass from the washing unit to a next step, a robot used for loading or unloading the glass, fed by the second conveyor unit, on or from a spin dryer unit, the spin dryer unit used for rotating the glass, loaded on the dryer unit by the robot, at a high speed, thus primarily drying the glass, a third conveyor unit used for feeding the glass, dried by the spin dryer unit and unloaded from the spin dryer unit by the robot, to a next step, a hot plate unit used for thermally heating and finally drying the glass fed by the third conveyor unit, a cool plate unit used for cooling the glass from the hot plate unit, and a cassette loader unit used for stacking such glasses from the cool plate unit in a way such that one glass is laid on top of another glass, further comprising:

first and second pure water supply pipes respectively arranged above said second conveyor unit and in a glass holding finger of said robot, with a plurality of pure water spray nozzles being provided on each of said pure water supply pipes, said pipes continuously spraying pure water onto a surface of each of the glasses when the glasses are fed from the washing unit by the second conveyor unit and when the glasses are loaded on the spin dryer unit by the robot, thus preventing the surface of each glass from being partially dried and thereby allowing the surface of each glass to be free from any spot due to washing water.

* * * * *